UNITED STATES PATENT OFFICE 1,924,793

PAINT FOR INDICATING HEAT

Franz Laske, Berlin-Steglitz, Germany

No Drawing. Application June 29, 1928, Serial No. 289,329, and in Germany June 30, 1927

2 Claims. (Cl. 134—39)

My invention relates to improvements in paints for indicating changes of temperature, and more particularly in paints which when applied to parts of apparatus, conduits and the like are changed in colour by an increase of the temperature beyond a certain limit. Paints of this character as are now in use are such that they assume the original colour after the temperature has fallen off to the normal. Now, in most cases it is important to have a lasting proof of the fact that the temperature of electric conductors, heating systems, storage receptacles and the like has risen beyond a certain limit, so that the endangered part can be ascertained even after normal conditions have been reestablished and the temperature has fallen off to the normal.

With this object in view my invention consists in manufacturing paints from chemical substances which by an increase of the temperature beyond a certain limit are changed so that they undergo a lasting change of colour, so that the superheated parts can be ascertained by an inspection made after the normal temperature has been reestablished. Suitable dye-stuffs are such which undergo a change of colour by an increase of the temperature either by decomposition or change of structure, or by reaction of substances which at normal temperature do not react on each other but at elevated temperature do react while changing in colour. For example a paint may be used which consists of lead dioxide ($PbO_2$), which lead dioxide gives off one atom of oxygen at a certain temperature while changing its colour from black to a lighter yellowish shade. As an example of substances entering into reaction at elevated temperature reference may be made to a mixture of sulfide of lead (PbS) and barium superoxide ($BaO_2$) in a suitable vehicle. The colour of the point at normal temperature is gray-black, and it is discoloured at elevated temperature while forming sulfate of lead and barium oxide.

Particularly suitable for the purpose aimed at are substances which when heated split off sulfur, hydrogen sulfide or other readily reacting sulfur compounds, and, as additional components of the paint substances which are changed in colour by sulfur or its compounds. Such substances are particularly metals or metal compounds the sulfides of which have a strong colour different from that of the metals and the metal compounds. A suitable paint consists for example of a mixture of litharge with thiourea ($CSN_2H_4$) in a suitable vehicle. The yellow colour of the paint is changed at a temperature slightly exceeding 100° C. into a lasting brown-black. Other examples of metals are lead, iron, quicksilver, antimony, arsenic, cadmium, copper, nickel, cobalt and their compounds.

Paints of the class indicated are useful for example in the electric art for indicating where a conduit or a cable end and the like has been overloaded, or where bearings, parts of heating systems and the like have been heated to excessive temperature.

In lieu of thio-urea I may make use of compounds which at elevated temperature are changed to or form thio-urea such for example as rhodammonium.

I claim:

1. A paint for indicating increase in temperature, the materials of which the paint is composed including a metallic sulphur free substance exhibiting a distinct color subject to irreversible change when combined with sulphur and selected from the group containing lead, iron, quicksilver, antimony, arsenic, cadmium, copper, nickel, litharge, barium dioxide, and cobalt, and including a substance yielding a sulphur compound when heated such as thiourea or a substance yielding thiourea at elevated temperature and selected from the group containing thiourea and rhodammonium.

2. A paint for indicating an increase in temperature, the ingredients of the paint including litharge and thiourea.

FRANZ LASKE.